(12) United States Patent
Neuhof et al.

(10) Patent No.: US 9,038,969 B2
(45) Date of Patent: May 26, 2015

(54) SUPPORT PROFILE FOR A SUPPORT ARM SYSTEM

(75) Inventors: Markus Neuhof, Ehringshausen-Niederlemp (DE); Paul Root, Bad Endbach (DE)

(73) Assignee: RITTAL GMBH & CO. KG, HERBORN (DE)

( * ) Notice: Subject to any disclaimer, the term of this patent is extended or adjusted under 35 U.S.C. 154(b) by 0 days.

(21) Appl. No.: 13/261,371

(22) PCT Filed: Dec. 20, 2010

(86) PCT No.: PCT/EP2010/070283
§ 371 (c)(1),
(2), (4) Date: Jul. 19, 2012

(87) PCT Pub. No.: WO2011/091914
PCT Pub. Date: Aug. 4, 2011

(65) Prior Publication Data
US 2012/0286107 A1 Nov. 15, 2012

(30) Foreign Application Priority Data

Jan. 26, 2010 (DE) .......................... 10 2010 000 206
Oct. 20, 2010 (DE) .......................... 10 2010 060 082

(51) Int. Cl.
*F16L 3/08* (2006.01)
*H02G 3/04* (2006.01)
*F16M 11/04* (2006.01)
*F16S 3/00* (2006.01)

(52) U.S. Cl.
CPC ............. *H02G 3/0437* (2013.01); *F16M 11/04* (2013.01); *F16S 3/00* (2013.01); *H02G 3/0487* (2013.01); *F16M 2200/065* (2013.01)

(58) Field of Classification Search
CPC .................................. F16M 11/04; H02G 3/04
USPC ............. 248/59, 74.2, 74.1, 51, 56; 174/68.3, 174/95, 99 R, 97, 96, 101; 138/115, 116, 138/117; 428/213, 36.9, 122, 188, 586, 428/34.1, 595, 598
See application file for complete search history.

(56) References Cited

U.S. PATENT DOCUMENTS 3,059,589 A * 10/1962 Schreyer ........................ 104/111
3,520,663 A * 7/1970 Schertel ........................ 428/582
3,528,559 A * 9/1970 Miller ............................ 211/195
3,782,048 A * 1/1974 Corman ........................ 52/282.2
4,086,967 A * 5/1978 Eftefield et al. .............. 172/777

(Continued)

FOREIGN PATENT DOCUMENTS

DE        38 05 425 C1      2/1989
DE        44 03 593 A1      3/1995

(Continued)

*Primary Examiner* — Kimberly Wood
(74) *Attorney, Agent, or Firm* — Marshall & Melhorn, LLC

(57) ABSTRACT

The invention relates to a support arm profile for a support arm system, comprising a receiving space for cables or the like which is open toward the surroundings, wherein a connecting element is molded inside the support arm cross-section and is connected indirectly or directly to two opposite side walls of the profiled support element. In such a support profile, high profile stiffness, which meets all the requirements of a support arm system, can be achieved in that two delimiting elements are connected, spaced apart, to the connecting element, and that the delimiting elements extend from the connecting element at an angle to the side walls.

6 Claims, 7 Drawing Sheets

(56) References Cited

U.S. PATENT DOCUMENTS

| | | | | |
|---|---|---|---|---|
| D268,288 S | * | 3/1983 | Cowdroy | D25/121 |
| 4,391,426 A | * | 7/1983 | Gothberg | 248/49 |
| 4,392,677 A | * | 7/1983 | Hardouin | 285/124.5 |
| 4,429,502 A | * | 2/1984 | Kinnebrew, IV | 52/263 |
| 4,442,992 A | * | 4/1984 | Worrallo | 248/243 |
| 4,463,057 A | * | 7/1984 | Knurr | 428/595 |
| 4,841,688 A | * | 6/1989 | Rinaldi | 52/63 |
| 4,884,376 A | * | 12/1989 | DeBlock et al. | 52/92.2 |
| 4,950,099 A | * | 8/1990 | Roellin | 403/348 |
| 4,953,821 A | | 9/1990 | Reuter et al. | |
| 4,997,155 A | * | 3/1991 | Reuter et al. | 248/278.1 |
| 4,998,702 A | * | 3/1991 | Reuter et al. | 248/278.1 |
| 5,046,791 A | * | 9/1991 | Kooiman | 312/265.1 |
| 5,085,485 A | * | 2/1992 | Wurl | 296/204 |
| 5,235,136 A | * | 8/1993 | Santucci et al. | 174/68.3 |
| 5,242,004 A | * | 9/1993 | Stilling | 160/57 |
| 5,290,612 A | * | 3/1994 | Schuler et al. | 428/34.1 |
| 5,413,437 A | * | 5/1995 | Bristow | 408/1 R |
| 5,460,894 A | * | 10/1995 | Munch et al. | 428/586 |
| 5,522,118 A | | 6/1996 | Neuhof et al. | |
| 5,545,488 A | * | 8/1996 | Burke | 428/586 |
| D383,926 S | * | 9/1997 | Spector | D6/495 |
| 5,806,261 A | * | 9/1998 | Huebner et al. | 52/283 |
| 5,921,052 A | * | 7/1999 | Kemp | 52/831 |
| 6,016,632 A | * | 1/2000 | McGee et al. | 52/241 |
| 6,155,693 A | * | 12/2000 | Spiegel et al. | 362/147 |
| 6,216,986 B1 | * | 4/2001 | Kwilosz | 248/74.1 |
| 6,389,988 B1 | * | 5/2002 | Frattini | 108/50.02 |
| 6,490,832 B1 | * | 12/2002 | Fischbach et al. | 52/207 |
| 6,821,640 B2 | * | 11/2004 | Wullrich et al. | 428/595 |
| D570,500 S | * | 6/2008 | Siemens | D25/122 |
| 7,410,141 B2 | * | 8/2008 | Hartwick | 248/317 |
| 7,537,188 B2 | * | 5/2009 | Root et al. | 248/295.11 |
| 8,376,166 B2 | * | 2/2013 | Kindig et al. | 220/4.02 |
| 2003/0163962 A1 | * | 9/2003 | Jefferson | 52/220.1 |
| 2005/0220633 A1 | * | 10/2005 | Hunsberger et al. | 417/279 |
| 2009/0230257 A1 | * | 9/2009 | Reyen et al. | 248/74.2 |
| 2012/0298810 A1 | * | 11/2012 | Chen et al. | 248/74.1 |

FOREIGN PATENT DOCUMENTS

| | | | |
|---|---|---|---|
| DE | 19630807 C1 | * | 12/1997 |
| DE | 102010024969 A1 | * | 2/2011 |
| DE | 102010005193 A1 | * | 7/2011 |

* cited by examiner

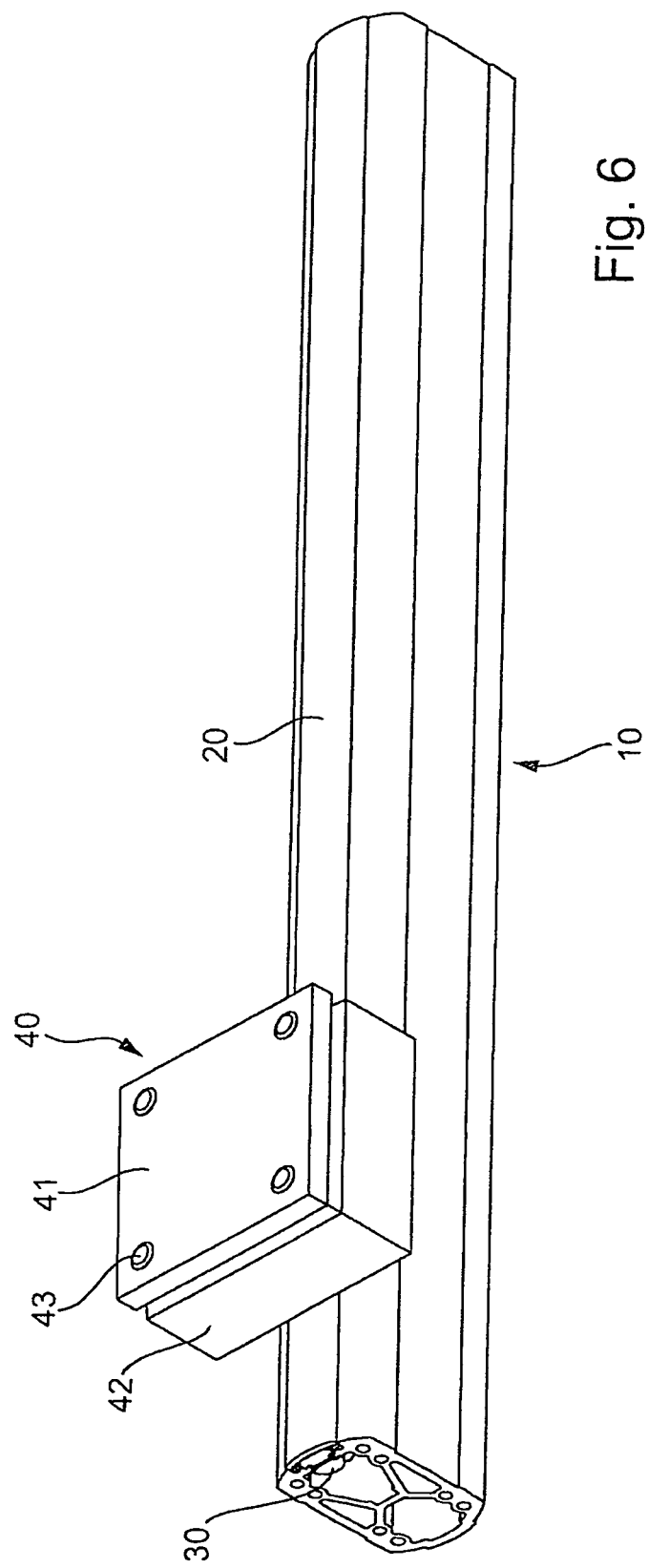

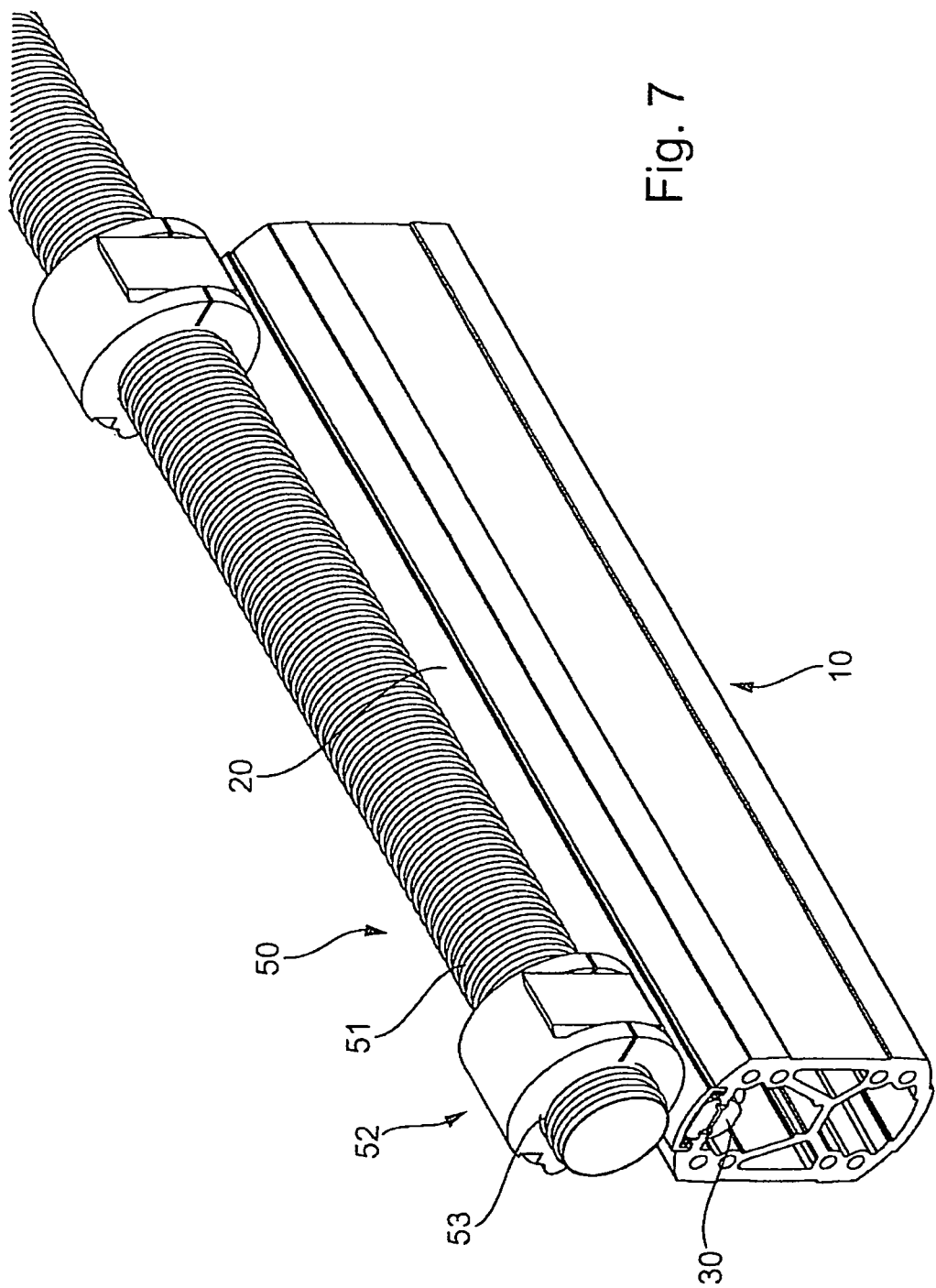

SUPPORT PROFILE FOR A SUPPORT ARM SYSTEM

BACKGROUND OF THE INVENTION

The invention relates to a support profile for a support arm system, comprising a receiving space for cables or the like which is open towards the surroundings, wherein a connecting element is moulded inside the support profile cross-section which is connected directly or indirectly to two opposite side walls of the support profile.

Support arms having support profiles are used as components of support arm systems. They serve, for example, to mount a machine control device to a machine tool and to make it accessible for a user. The machine control device is usually connected with the machine control by means of electrical signal lines. The signal lines are safely located within the receiving space of the support profile.

A support arm for a support arm system is known from DE 38 05 425 C1. The support arm comprises a support profile which is embodied as an extruded aluminium profile. The support profile comprises wall elements delimiting the receiving space for the signal lines. The cables may be introduced into the receiving space via an insert opening. A cover element closing the insert opening is used for protective covering. The support profiles are partly subjected to very high loads. Thus, there are high requirements to profile stiffness. Accordingly, a horizontal web in the form of a delimiting element is arranged in the region of the inner cross-section of the support profile. That web is integrally moulded to the vertical side walls of the support profile.

For very high loads, support profiles which are closed on all sides offer good load capacities. Those support profiles closed on all sides also comprise a receiving space for cables, which however must be inserted through the open end side of the support profiles. Later installation of supplemental lines is associated with a certain assembly effort. Such a support profile is for example described in DE 44 03 593 A1.

SUMMARY OF THE INVENTION

It is the object of the invention to provide a support profile, in particular for a support arm system, which is characterized by a high profile stiffness and wherein a simple cable installation is possible.

This object is solved in that two delimiting elements are connected, spaced apart, to the connecting element and that the delimiting elements extend from the connecting element at an angle to the side walls.

The delimiting elements serve for additional stiffening of the support profile, wherein the angled arrangement with respect to the side walls takes differing load directions in support profiles for support arm systems into account. Accordingly, the support profiles are, in most applications, horizontally installed, while a control device is suspended at an overhanging support profile end. As a result, bending moments are created within the support profile which act around the central transverse plane. The delimiting elements increase the resisting torque against bending and thus offer an additional stiffening. Simultaneously, however, transverse forces often act in horizontal direction, which also may partly be carried away by the delimiting elements. Furthermore, the delimiting elements increase resistivity of the support profile against torsion which is in particular advantageous when a force (for example the weight force of a control device) acts on the support profile in a distance to the central longitudinal axis of the support profile.

According to a preferred alternative of the invention it is provided that the connecting element extends, shaped as a wall, towards the profile width and between the side walls.

A further improvement of the support profile strength may be achieved in a simple way in that two further delimiting elements are connected, spaced apart from the side walls, to the connecting element, and that the delimiting elements and the further delimiting elements respectively extend from the connection elements in opposite directions. The connecting element serves as a central connecting part for the delimiting elements which emerge star-like therefrom and thereby contribute to profile stiffening in all profile transverse directions.

A preferred variant of the invention is in such a way that the side walls merge at their ends into a corner piece and that the delimiting elements are moulded to the corner pieces. In this way, the delimiting elements can produce large support spans. The corner pieces may for example connect the side walls which generally extend vertically in profile height direction with profile parts extending in transverse direction.

A further improvement of the profile stiffness may be achieved in that the side walls merge at both of their ends into corner pieces and that both of the delimiting elements and the further delimiting elements are moulded to the corner pieces.

A support profile according to the invention may be in such a way that two screw channels extending in longitudinal profile direction are machined into the corner pieces. Connecting elements, for example swivel joints, corner pieces or set-up joints, may be screwed at the front of the screw channels. The second screw channel of a corner piece may then be occupied by a compensating element which allows alignment of the profile longitudinal axis with respect to the connected component.

Low cost of material for the support profile results in particular if it is provided that the delimiting elements and the connection element delimit the receiving space.

A further support profile according to the invention may be characterized in that the receiving space is accessible via an insert opening, that the insert opening is delimited by two tabs extending in longitudinal profile direction, that the tabs are connected by a connector and that the connector comprises to fastener parts clamped with the tabs. The connector prevents that the support profile bends open in the region of the inlet opening under extremely high loads. The connector, if properly configured, may be used additionally for coupling mounting elements.

If it is provided that a cover is latched at counter latching elements of the support profile, wherein the cover covers the insert opening at least partly by means of a blind, an optical finish may be achieved.

BRIEF DESCRIPTION OF THE DRAWINGS

The invention is explained in detail below by an exemplary embodiment illustrated in the drawings. It is shown in:

FIG. 6 the support profile of FIG. 5 with a small enclosure mounted thereto; and FIG. 7 a support profile with installed cable, media or protective tube.

DETAILED DESCRIPTION OF THE INVENTION

Figure 1:
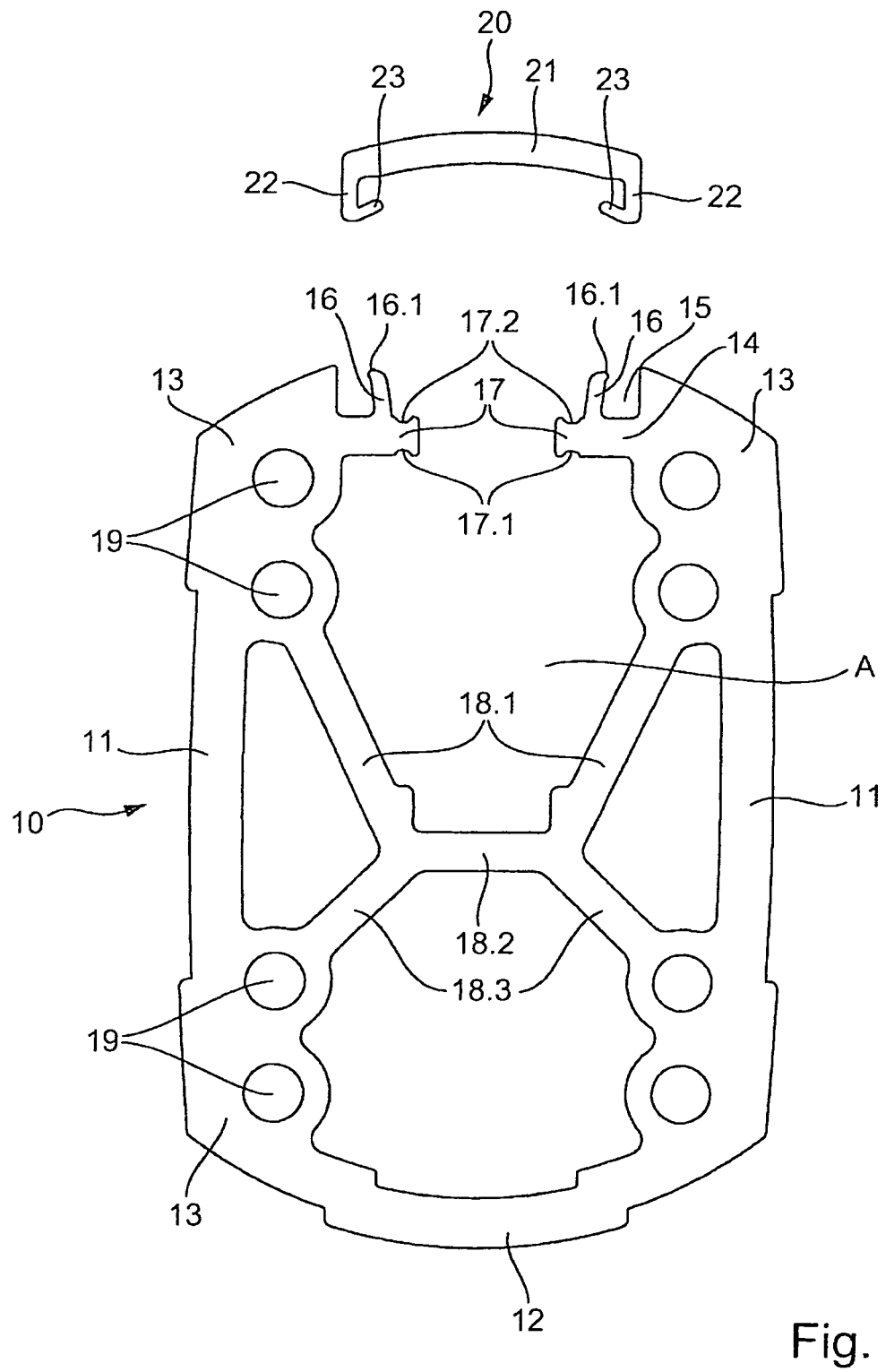
FIG. 1 an end view of a support profile of a support arm having a cover.
Figure 2:
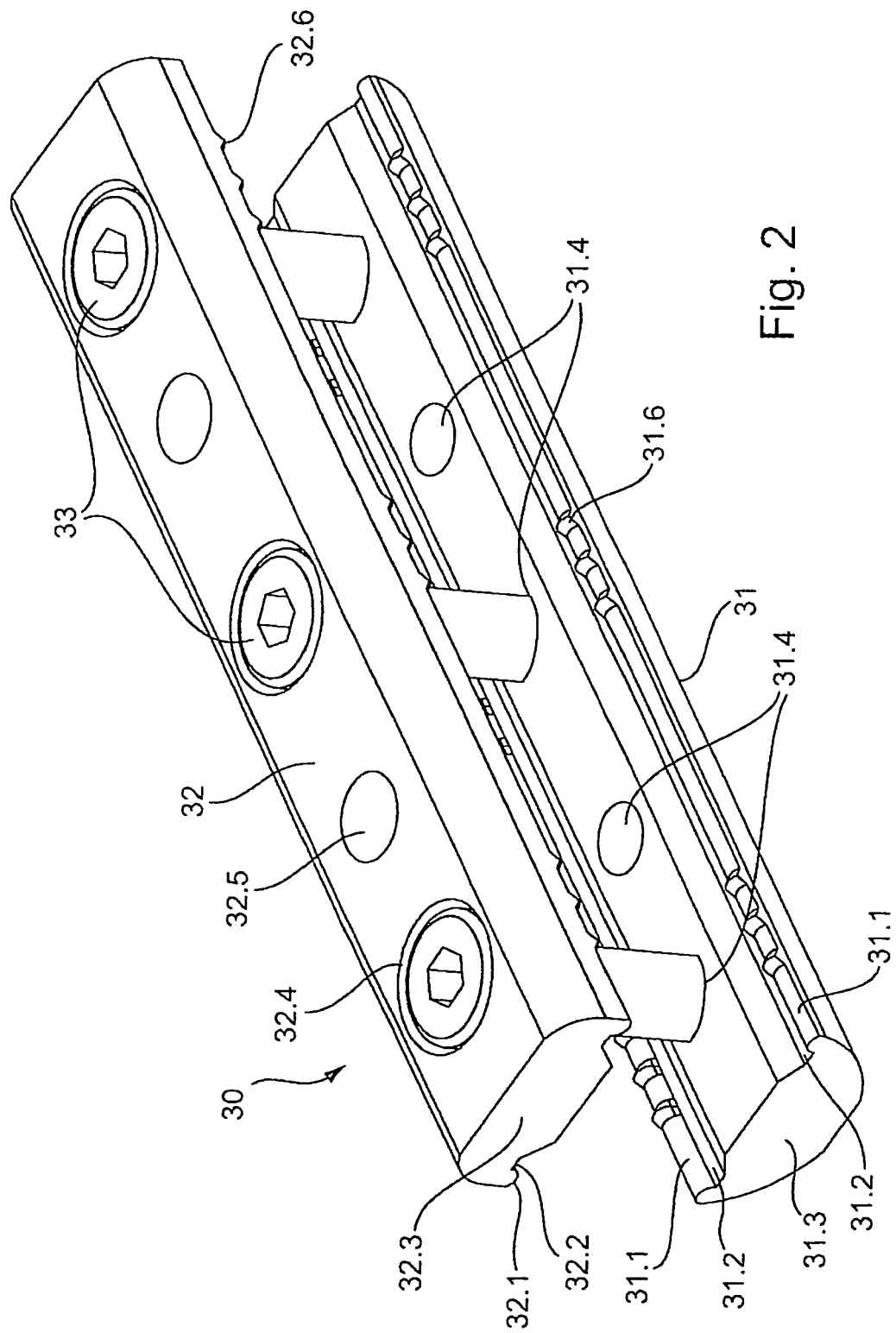
FIG. 2 a connector for coupling to the support profile of FIG. 1 in a perspective illustration.

As illustrated in FIG. 1, support profile 10 comprises two parallel vertical side walls 11 which terminate in corner pieces 13 at their longitudinal ends. Both lower corner pieces 13 are integrally connected by means of a transition piece 12. Both upper corner pieces 13 respectively carry a tab 17 which is bar-shaped and delimits an insert opening in profile longitudinal direction. Two indentations 17.1 and 17.2 in the form of grooves are machined into both tabs 17. These indentations 17.1 and 17.2 extend in profile longitudinal direction. Tab 17 furthermore carries an upwardly protruding counter latching element, wherein a latching protrusion 16.1 is molded to an end thereof. Counter latching element 16, together with a wall of corner piece 13, delimits a groove 15. As already mentioned previously, both tabs 17 delimit an insert opening through which a receiving space A is accessible. Receiving space A is surrounded by sections of both upper corner pieces 13, tabs 17 and delimiting bars 18.1. Delimiting bars 18.1 respectively merge integrally into the upper corner pieces 13 at their ends and extend at an angle inwardly to the profile center. Delimiting bars 18.1 are molded to a connecting element 18.2 at their end facing away from corner pieces 13. Facing away from receiving space A, connecting element 18.2 carries two further delimiting bars 18.3. They are again integrally molded to both lower corner pieces 13 and also extend at an angle. By delimiting elements 18.1 and 18.3 and connecting element 18.2, a star-shaped stiffening structure is produced which increases the stiffness of support profile 10 considerably.

Corner pieces 13 are respectively equipped with two integrally molded screw channels 19 which extend continuously in profile longitudinal direction. By means of connecting screws, support arm components which are not illustrated may be screwed to the screw channels 19. For example, corner pieces, adapters, swivel joints etc. are mounted as support arm components.

As already mentioned previously, both tabs 17 delimit an insert opening which gives access to receiving space A. That insert opening may be covered by means of a cover 20. Cover 20 is embodied as a plastic molded piece and comprises a convex blind 21 to which two downwardly protruding tabs 22 are integrally molded. Tabs 22 are parallel and spaced apart. The free ends of tabs 22 terminate in latching elements 23. For mounting, cover 20 it is put onto the support profile 10 in such a way that tabs 22 immerse into grooves 15 of support profile 10. As a result, latching elements 23 are directed outwardly at counter latching elements 16 until they latch behind latching protrusion 16.1.

Convex blind 21 merges into the adjacent surfaces of corner pieces 13, so that a harmonious finish is created, according to the finish which is formed on the opposite side by means of transition piece 12. FIG. 6 shows the installed cover.

Figure 3:
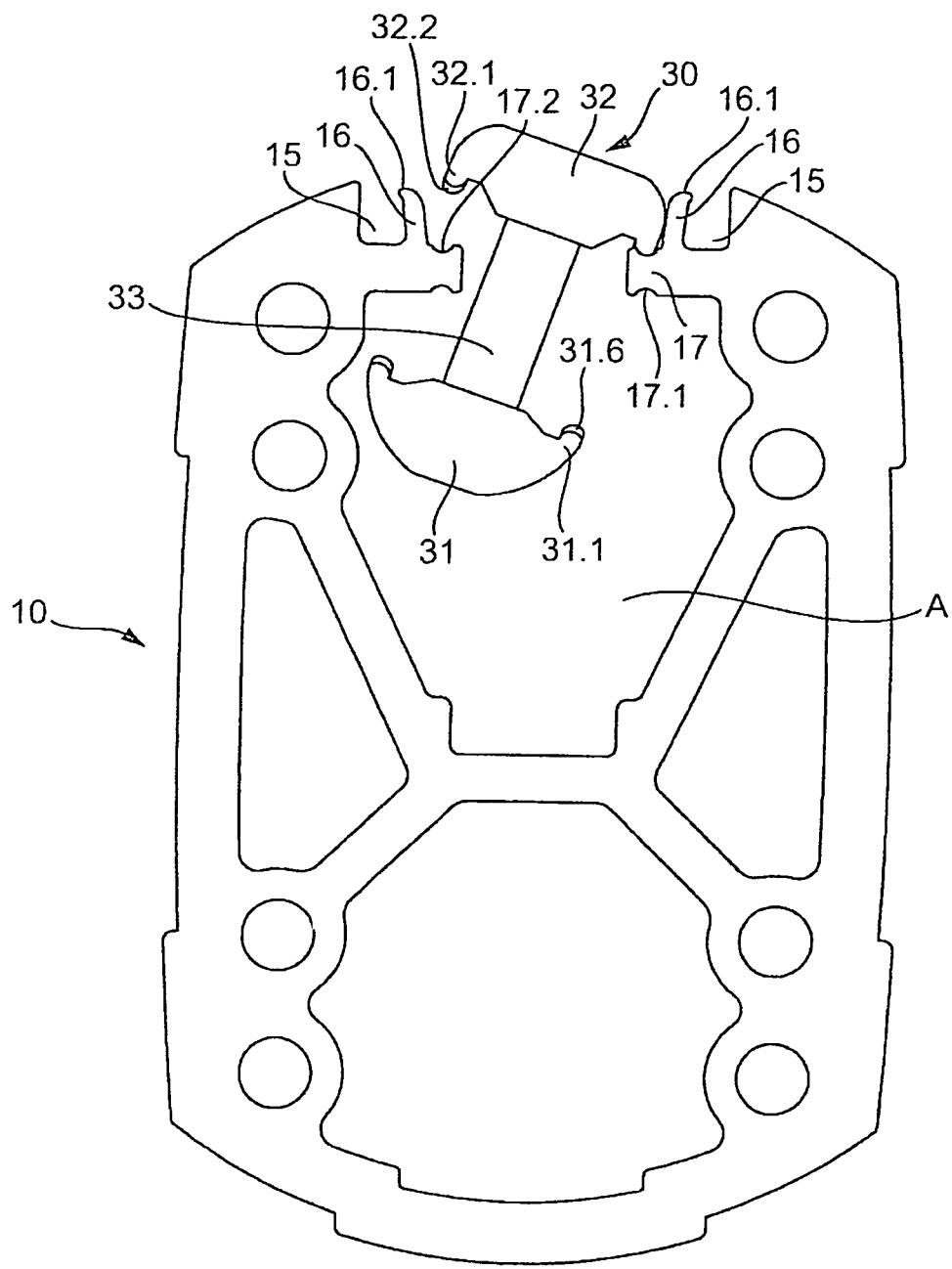
FIG. 3 the support profile of FIG. 1 with inserted connector.

In FIG. 3, a connector 30 is illustrated. The connector consist of two fastener parts 31 and 32 which are substantially identical in construction. Fastener parts 31, 32 respectively comprise a basis part 31.3, 32.3 to which protrusions 31.1, 32.1 are molded laterally. Protrusions 31.1, 32.1 are shaped as rips having a convexly domed surface. Directed inwardly, recesses 31.2, 32.2 are joining protrusions 31.1, 32.1, extending in longitudinal direction of connector 30 in the form of grooves. Between recesses 31.1 or 32.1, respectively, a transition section remains. Threaded receptacles 31.4 and 31.5 are machined into that transition section of fastener part 31. Opposite threaded receptacles 31.4, screw receptacles 32.4 are brought into the transition region of fastening part 32. Bores 32.5 are opposite threaded receptacles 31.5. Clamping screws 33 may be guided through screw receptacles 32.4 and screwed into threaded receptacles 31.4. When clamping screws 33 are tightened, the distance between the both fastener parts 31 and 32 decreases. While doing so, elevations 32.6, which are molded to protrusions 31.1 or 32.1, respectively, in the form of prongs, approach each other.

Figure 4:
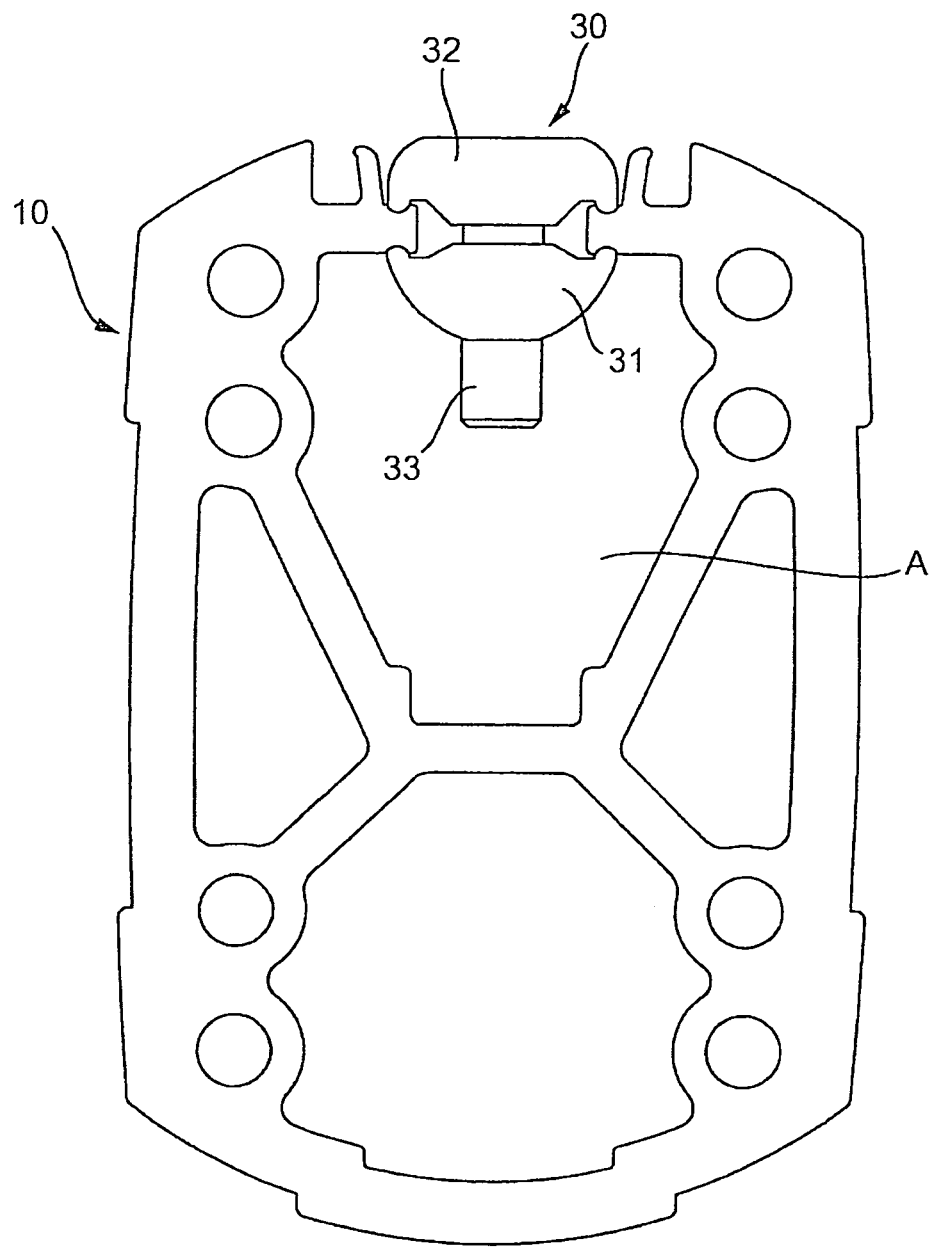
FIG. 4 the illustration according to FIG. 3, however with completely mounted connector.

Connector 30 may be fastened at support profile 10. To this end, connector 30 is inserted into the insert opening, as illustrated by FIG. 3. Connector 30 may be either pushed in via the open longitudinal side of support profile 10 or, as illustrated in FIG. 3, be pivoted into the insert opening from above. In a pivoted state, fastener part 32 rests on the outside of tabs 17. Fastener part 31 is arranged in the region of receiving space A below tab 17. While tightening clamping screws 33, fastening parts 31, 32 approach to each other. Protrusions 32.1, 31.1 immerse into groove-shaped indentations 17.1, 17.2 of tabs 17. When tensioning clamping screws 33, elevations 32.6, 31.6 dig into the bottom of the groove on indentation 17.2, 17.1, thus forming a form-fit. In this way, connector 30 is form-fittingly connected to the support profile 10 both in longitudinal and transverse direction thereof. This installation position is illustrated in FIG. 4.

Figure 5:
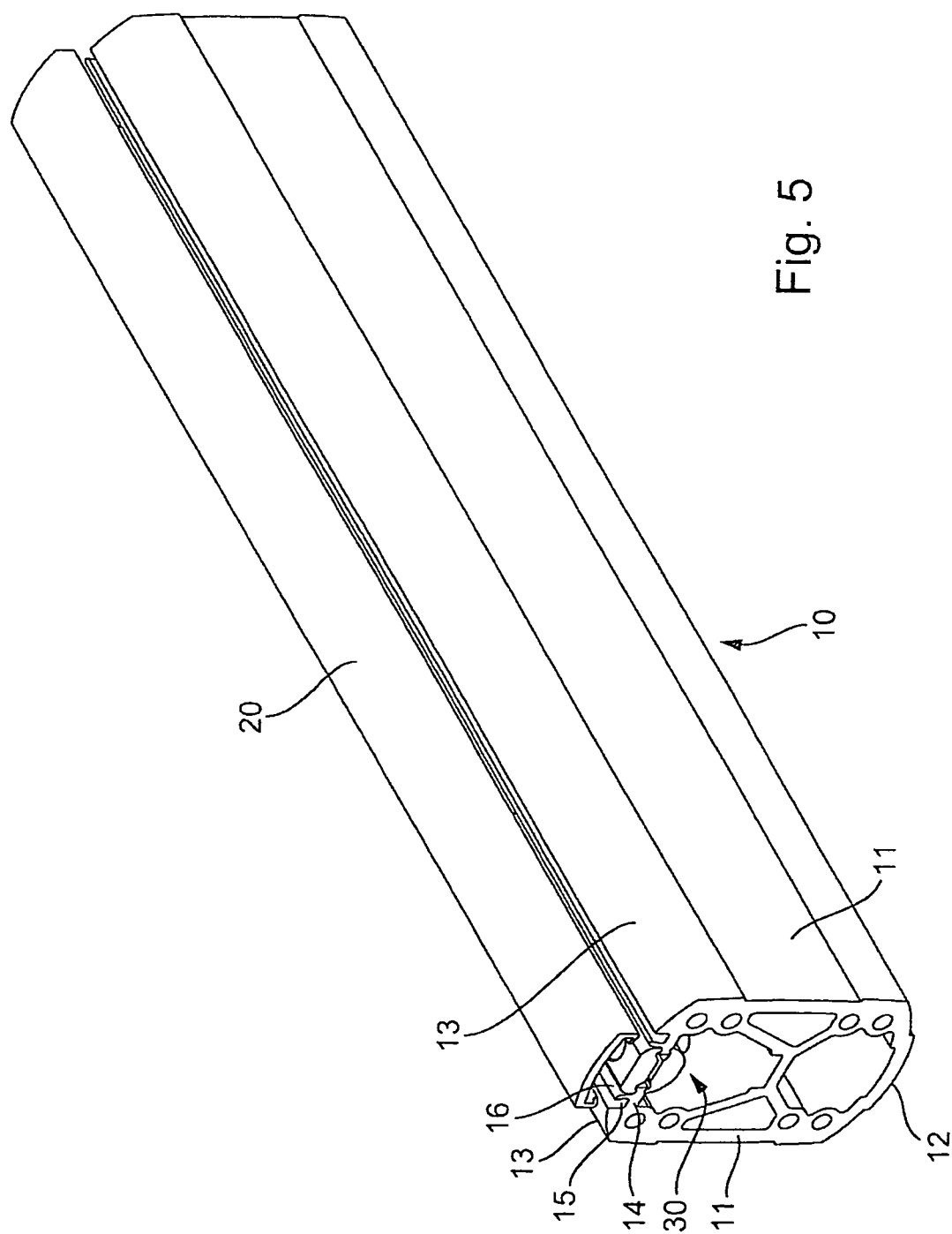
FIG. 5 a perspective representation of the support profile with connector and cover.

As shown in FIG. 5, connector 30 may be covered by a respective cover 20, as already explained with reference to FIG. 1. Thus, connector 30 is optically invisible. In the scope of the invention, connector 30 may extend over the entire length of support profile 10 or only over a limited portion of the support profile.

Connector 30 stiffens support profile 10. Furthermore, mounting parts 40, 50 may be attached to connector 30. In FIG. 6, a small enclosure as mounting part 40 is mounted to connector 30. The small enclosure comprises a housing bottom part 42 which may be closed by a lid 41. Lid 41 is connected to housing bottom part via screws 43. With removed lid 41, fastening screws may be guided through the housing floor of housing bottom part and screwed into the fastener receptacles 31.5 of connector 30. In this way, mounting part 40 may be connected with support profile 10.

In FIG. 7, a further variant of embodiment of a mounting part 50 is illustrated. As illustrated in this drawing, clamps/retaining brackets 52 are screwed to connectors 30 provided at longitudinal ends of the support profile. Clamps/retaining brackets 52 are again fixed in fastener receptacles 31.5 of connector 30. Clamps/retaining brackets 52 serve to fix protective or media tubes or for directly fixing cables.

The invention claimed is:

1. A support profile for a support arm system, comprising a receiving space for cables which is accessible via an insert opening and open towards the surroundings, wherein a connecting element is molded inside the support profile cross-section and is connected directly or indirectly to two opposite side walls of the support profile, wherein two delimiting elements and two further delimiting elements are connected, spaced apart from the side walls, to the connecting element and extend from the connecting element at an angle to the side walls, wherein the delimiting elements and the further delimiting elements respectively extend from the connecting element in opposite directions, wherein the side walls merge at both of their ends into corner pieces respectively equipped with two screw channels, both the delimiting elements and the further delimiting elements are molded to the corner pieces, and wherein cavities are defined between the connecting element, the delimiting elements, the further delimiting elements and the side walls, wherein the insert opening is further delimited by two tabs extending in longitudinal profile direction, each of the tabs comprising indentations on opposing sides of the tabs, and the tabs are connected by a connector and the connector comprises two fastener parts on opposing ends of the connector, with each faster part comprising a pair of protrusions which are configured to engage with the indentations of the tabs.

2. The support profile of claim 1, wherein the connecting element extends, shaped as a wall, towards the support profile width and between the side walls.

3. The support profile of claim 1, wherein the two screw channels in each corner piece extend in a longitudinal profile direction and are machined into the corner pieces.

4. The support profile of claim 1, wherein the delimiting elements and the connection element delimit the receiving space.

5. The support profile of claim 1, further comprising a cover latched to counter latching elements on the support profile, the cover having a blind that at least partly covers the insert opening.

6. A support profile for a support arm system, comprising a receiving space for cables which is accessible via an insert opening and open towards the surroundings, wherein a connecting element is molded inside the support profile cross-section and is connected directly or indirectly to two opposite side walls of the support profile, wherein two delimiting elements and two further delimiting elements are connected, spaced apart from the side walls, to the connecting element and extend from the connecting element at an angle to the side walls, wherein the delimiting elements and the further delimiting elements respectively extend from the connecting element in opposite directions, wherein the side walls merge at both of their ends into corner pieces respectively equipped with two screw channels, and both the delimiting elements and the further delimiting elements are molded to the corner pieces, wherein the insert opening is delimited by two tabs extending in longitudinal profile direction, the tabs are connected by a connector and the connector comprises two fastener parts clamped with the tabs, and wherein the support profile further comprises a cover latched to counter latching elements on the support profile, the cover having a blind that at least partly covers the insert opening, and cavities are defined between the connecting element, the delimiting elements, the further delimiting elements and the side walls of the profile element, each of the tabs comprising indentations on opposing sides of the tabs, and the tabs are connected by the connector and the connector comprises the two fastener parts on opposing ends of the connector, with each fastener part comprising a pair of protrusions which are configured to engage with the indentations of the tabs.

* * * * *